United States Patent [19]

Filippov et al.

[11] 4,142,731

[45] Mar. 6, 1979

[54] END-TYPE SEAL

[75] Inventors: Andrei N. Filippov; Alexandr N. Nechaev; Vladimir I. Sokolsky, all of Moscow, U.S.S.R.

[73] Assignee: Tsentralny Nauchno-Issledovatelsky Avtomobilny I Avtomotorny Institut Nami, U.S.S.R.

[21] Appl. No.: 796,664

[22] Filed: May 13, 1977

[51] Int. Cl.² .............................................. F16J 15/34
[52] U.S. Cl. .................................................. 277/96.1
[58] Field of Search ....................... 277/96, 96.1, 96.2

[56] References Cited
FOREIGN PATENT DOCUMENTS
812787   5/1937   France ................................. 277/96.1

Primary Examiner—Robert I. Smith
Attorney, Agent, or Firm—Robert E. Burns; Emmanuel J. Lobato; Bruce L. Adams

[57] ABSTRACT

The end-type seal according to the present invention, including a gland mounted in a casing, against which gland a sealing ring made from a graphite-containing material and having face surfaces is urged. Annular ridges are provided on the end surface of the sealing ring facing the gland. These ridges tightly bear against the gland surface until they are worn out to allow the sealing ring to come into close mating contact with the gland.

1 Claim, 3 Drawing Figures

END-TYPE SEAL

BACKGROUND OF THE INVENTION

The present invention relates to end-type seals and, primarily, to their sealing rings.

There are widely known end-type seals having a gland mounted in a casing and a sealing ring made from a graphite-containing material whose face surface bears against the gland.

This type of seal is used where a complete tightness or strictly limited leakage rates should be observed for a long period of service life. The leakages of liquid are comparatively high during the initial period of the seal operation, up to the moment when the cooperative surfaces of the gland and the sealing ring become run in so as to closely match each other. Here, accurately machining and matching these surfaces, making for reduced leakages, results in a more laborious process of making both the gland and the sealing ring. To overcome these disadvantages, a sealing ring with a tapered surface facing the gland has been proposed (Cf. U.S. Pat. No. 3,469,851 Cl. 277-85). This arrangement makes it possible to reduce to some extent the leakages of liquid during the initial period of the seal operation owing to a higher unit pressure in the contact area between the surfaces of the gland and the sealing ring.

It has also been proposed to make annular ridges on the surface of the sealing ring opposite to the surface thereof facing the gland. These ridges become deformed in the assembly of the seal under the pressure exerted on the sealing ring (Cf. U.S. Pat. No. 3,717,353, Cl. 277-96); thus, the inaccuracies of assembly are compensated for, this also resulting in somewhat reduced leakages during the initial period of operation of the seal. However, these leakages are relatively high in both cases.

SUMMARY OF THE INVENTION

The main object of the invention is to reduce the leakages of liquid through an end-type seal in the process of running in the gland and the sealing ring thereof.

Another object of the invention is to provide a less laborious process of making the gland and the sealing ring.

These and other objects of the invention are accomplished by providing an end-type seal comprising a gland mounted in a casing, a sealing ring made from a graphite-containing material, having free surfaces and urged against the gland, wherein, according to the invention, annular ridges are made on the face surface of the sealing ring facing the gland, these annular ridges tightly bearing against the surface of the gland until they are worn out to allow the sealing ring to come into close mating contact with the gland.

Preferably, each of the annular ridges is made in the form of an isosceles trapezoid in cross section, with the larger base lying on the face surface of the sealing ring, the sides of the trapezoid being inclined to this base at an angle ranging from 45° to 75°, the height of the trapezoid equalling 0.75 to 1.0 the length of its smaller base, and the overall area of the smaller bases for all said annular ridges accounting for 0.025 to 0.25 the area of the face surface of the sealing ring.

Such a shape of the annular ridge allows the leakages of liquid through the seal to be reduced to a minimum.

Desirably, the sealing ring is made from a composition comprising the following ingredients in percentage by weight: graphite powder — 30–95%; phenol-formaldehyde resin bond — 22–30% of the graphite content; an additive — 3% of the bond content, said additive consisting of hexamethylenetetramine, stearin and calcium hydroxide; a ductile non-ferrous metal power — 0–60%; and phenol-aniline-formaldehyde resin — 5–40%.

The sealing rings produced from the above material are more wear-resistant in operative interaction with steel and cast-iron components. The material being highly yieldable, it provides for good mould filling when pressure moulding of the sealing ring.

The end-type seal according to the invention allows the leakages of liquid therethrough to be reduced, whereas the elements of the seal made in accordance with the invention are less labour-consuming in production and more wear-resistant.

BRIEF DESCRIPTION OF THE DRAWINGS

One particular embodiment of the invention will now be described with reference to the accompanying drawings in which.

DESCRIPTION OF THE PREFERRED EMBODIMENTS

Figure 1:
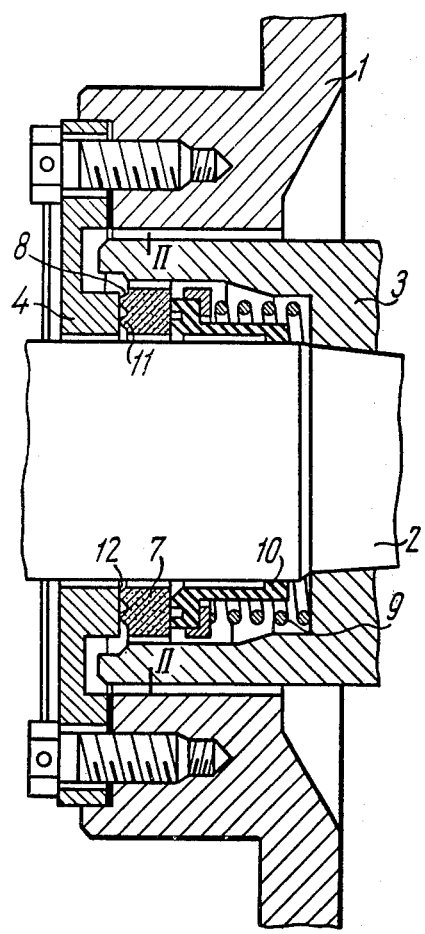
FIG. 1 shows the face-type liquid seal according to the invention in longitudinal section.
Figure 2:
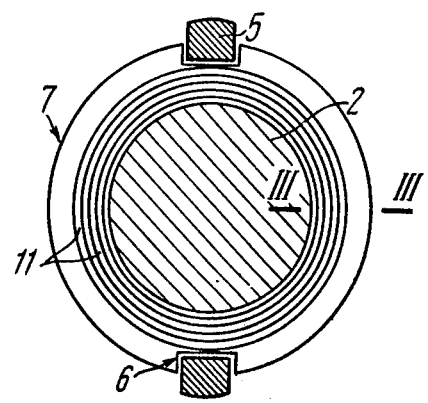
FIG. 2 is a section taken along the line II—II of FIG. 1.
Figure 3:
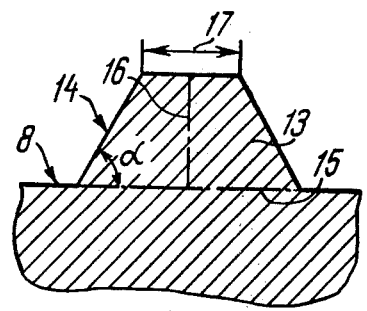
FIG. 3 is a section taken along the line III—III of FIG. 2.

Referring now to FIG. 1 of the drawings, the end-type seal incorporates a casing 1, wherein a shaft 2 carrying an impeller 3 is disposed. A gland 4 in the form of a flange is mounted in the casing 1. The impeller 3 is provided with tenon-type projections 5 (FIG. 2) fitting into slots 6 made in a sealing ring 7. The ring 7 faces the gland 4 with its face surface 8 and is urged against the gland by a spring 9 mounted in the impeller 3. A rubber packing ring 10 urged by the spring 9 against the sealing ring 7 is tightly mounted on the shaft 2.

The face surface 8 of the sealing ring 7 has annular projections 11 tightly bearing up against the surface 12 of the gland 4. In the course of running in the seal, the projections wear out, which allows leakages to be reduced during the initial period of service of the seal.

The cross section 13 of the annular ridges 11 is made in the form of an isosceles trapezoid whose sides are inclined to its larger base at an angle $\alpha$ ranging from 45° to 75°. The larger base 15 of the trapezoid lies on the face surface 8 of the sealing ring 7, and the trapezoid height 16 equals 0.75 to 1.0 the width of the smaller base 17. Such a shape of the annular ridges 11 makes for minimal leakages of fluid through the seal.

The sealing ring is made from a graphite-containing material. Taken in percentage by weight, the graphite powder accounts for 30–95%, and the bond, 22–30% of the graphite content, this bond comprising phenol-formaldehyde resin. The material of the sealing ring also includes an additive which accounts for 3% of the bond content and consists of hexamethylenetetramine, stearin and calcium hydroxide; a ductile non-ferrous metal powder which accounts for 0–60%; and phenol-aniline-formaldehyde resin, 5–40%.

This material provides for higher wear resistance of the sealing rings 7 in their operative interaction with the glands 4 made from cast-iron and steel.

The end-type seal according to the invention operates as follows. In rotation of the shaft 2, the sealing ring 7, the rubber packing ring 10 and the spring 9 are also rotated. The sealing ring 7, urged by the spring 9 against the gland face 12, tightly bears up against the gland 4. Thereby, the chamber of the casing 1 is sealed against the atmosphere, and the leakages of liquid are excluded. As the shaft 2 rotates in the course of operation, the annular ridges 11 gradually wear out, and the face surface 8 of the sealing ring comes to interact with the surface 12 of the gland 4. Thus, a close mating contact of the sealing ring 7 with the gland 4 is ensured at all times, i.e. both in the process of wearing out of the ridges 11 and during the succeeding period of service of the seal. As a result, the leakages of fluid from the chamber of the casing 1 are virtually excluded.

What is claimed is:

1. An end-type seal comprising a casing; a gland mounted in said casing; a sealing ring made from a graphite-containing material, having face surfaces and urged in use against said gland; annular ridges of equal height and trapezoidal in configuration on the face surface of said sealing ring facing said gland, said annular ridges tightly bearing against the surface of said gland until they are worn down to allow said sealing ring to come into close mating contact with said gland, each of said annular ridges being in the form of an isosceles trapezoid in cross section, with a larger base on said face surface of said sealing ring, the sides of said trapezoid being inclined to said larger base at an angle ranging from at least 45° to 75°, the height of the trapezoid equalling 0.75 to 1.0 the width of its smaller base, and the overall area of the smaller bases for all said annular ridges accounting for greater than 0.025 and up to 0.25 the area of said surface of the sealing ring.